United States Patent
Jauh et al.

(10) Patent No.: US 10,004,072 B2
(45) Date of Patent: Jun. 19, 2018

(54) WIRELESS DEVICE FOR IMPROVING OPERATING EFFICIENCY

(71) Applicant: MEDIATEK INC., Hsin-Chu (TW)

(72) Inventors: Yuh-Ren Jauh, Taoyuan (TW); Yung-Ping Hsu, Taipei (TW); Kun-Chien Hung, Pingtung County (TW)

(73) Assignee: MEDIATEK INC., Hsin-Chu (TW)

( * ) Notice: Subject to any disclaimer, the term of this patent is extended or adjusted under 35 U.S.C. 154(b) by 53 days.

(21) Appl. No.: 14/684,449

(22) Filed: Apr. 13, 2015

(65) Prior Publication Data

US 2016/0150540 A1    May 26, 2016

Related U.S. Application Data

(60) Provisional application No. 62/084,559, filed on Nov. 26, 2014.

(51) Int. Cl.
*H04B 7/212* (2006.01)
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
CPC . H04L 5/14; H04L 2012/5608; H04B 7/2045; H04B 7/208; H04B 7/2621
USPC ........................................ 370/281, 319, 344
See application file for complete search history.

(56) References Cited

U.S. PATENT DOCUMENTS

| | | | |
|---|---|---|---|
| 8,548,410 B2 * | 10/2013 | Jussila | H04B 1/0075 455/189.1 |
| 2003/0207668 A1 | 11/2003 | McFarland | |
| 2006/0292986 A1 | 12/2006 | Bitran | |
| 2011/0319123 A1 | 12/2011 | Kwun | |
| 2012/0224612 A1 * | 9/2012 | Kim | H04L 1/0003 375/219 |
| 2012/0327869 A1 | 12/2012 | Wang | |
| 2013/0194938 A1 | 8/2013 | Immonen | |
| 2014/0301339 A1 * | 10/2014 | Sesia | H04B 1/0067 370/329 |
| 2016/0277093 A1 | 9/2016 | Seo | |
| 2016/0365995 A1 | 12/2016 | Liu | |

FOREIGN PATENT DOCUMENTS

| | | |
|---|---|---|
| CN | 1179071 A | 4/1998 |
| CN | 103138811 A | 6/2013 |
| CN | 103781202 A | 5/2014 |
| TW | 201251346 A1 | 12/2012 |
| TW | 201434283 A | 9/2014 |

\* cited by examiner

*Primary Examiner* — Brenda H Pham
(74) *Attorney, Agent, or Firm* — Winston Hsu

(57) ABSTRACT

A wireless device and an associated wireless device are proposed. The wireless device includes a first receiving circuit, a second receiving circuit and a detector. The first receiving circuit is arranged to receive signals in a first band. The second receiving circuit is arranged to selectively receive signals in the first band or signal reception in a second band according to a first control signal, wherein the second band is different from the first band. The detector is arranged to detect existence of a transmission signal in the second band to set the first control signal.

9 Claims, 5 Drawing Sheets

WIRELESS DEVICE FOR IMPROVING OPERATING EFFICIENCY

CROSS REFERENCE TO RELATED APPLICATIONS

This application claims the benefit of U.S. provisional application No. 62/084,559, filed on Nov. 26, 2014, and incorporated herein by reference.

BACKGROUND

The embodiments of the present invention relate to wireless communications, and more particularly, to a wireless local area network (WLAN) apparatus which is capable of dynamically adjusting the operating frequencies of a wireless device and a wireless device, to thereby improve the performance of a wireless communications system.

Wireless local area networks (WLANs) are widely applied in various specifications, such as IEEE 802.11a, IEEE 802.11b, IEEE 802.11g, IEEE 802.11n, and IEEE 802.11ac. Some of these standards employ a multiple input multiple output (MIMO) OFDM scheme, and may support both the 2.4 GHz and 5 GHz bands.

FIG. 1 is a diagram illustrating exemplary continuous spectrums 101 and non-continuous spectrums 102 to be setup in its network. The bandwidth of the continuous spectrums 101 may be 20 MHz, 40 MHz, 80 MHz, or 160 MHz; and the selected bandwidth of the non-continuous spectrums 302 may be any of the following combinations of primary and secondary segments: 40 MHz+40 MHz, 40 MHz+80 MHz, 80 MHz+40 MHz, and 80 MHz+80 MHz. When receiving one non-continuous combination, two receiving circuits are required for receiving the primary segment and the secondary segment, respectively.

The receiving schemes of the existing wireless transceivers are not flexible. For example, when only first segment signals are transmitted, the receiving circuit arranged for receiving the second segment signals will enter an idle mode, so the entire system is not fully used. There is therefore a need for an innovative transmitter and receiver design to solve the aforementioned problem.

SUMMARY

One of the objectives of the present invention is to propose a smart signal reception scheme and a smart signal transmission scheme. The proposed signal reception scheme is capable of adaptively adjusting usage of all receiving circuits based on the transmitted non-continuous band signals.

According to a first aspect of the present invention, a wireless device (e.g. a wireless receiving device) is proposed. The wireless device includes a first receiving circuit, a second receiving circuit and a detector. The first receiving circuit is arranged to receive signals in a first band. The second receiving circuit is arranged to selectively receive signals in the first band or signal reception in a second band according to a first control signal, wherein the second band is different from the first band. The detector is arranged to detect existence of a transmission signal in the second band to set the first control signal.

According to a second aspect of the present invention, a wireless device is proposed. The wireless device includes a first transmitting circuit, a second transmitting circuit and a controller. The first transmitting circuit is arranged to transmit a signal in a first band. The second transmitting circuit is arranged to selectively transmit a signal in the first band or in a second band according to a first control signal, wherein the second band is different from the first band. The controller is arranged to set the first control signal according to a transmission mode.

According to a third aspect of the present invention, a method is proposed. The method includes: receiving a wireless signal in the first band with a first receiving circuit; switching a second receiving circuit from receiving a second band to the first band if the wireless signal is in the first band only; and switching the second receiving circuit to receive the second band when the wireless signal ends, wherein the first band is different from the second band.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function.

Figure 1:
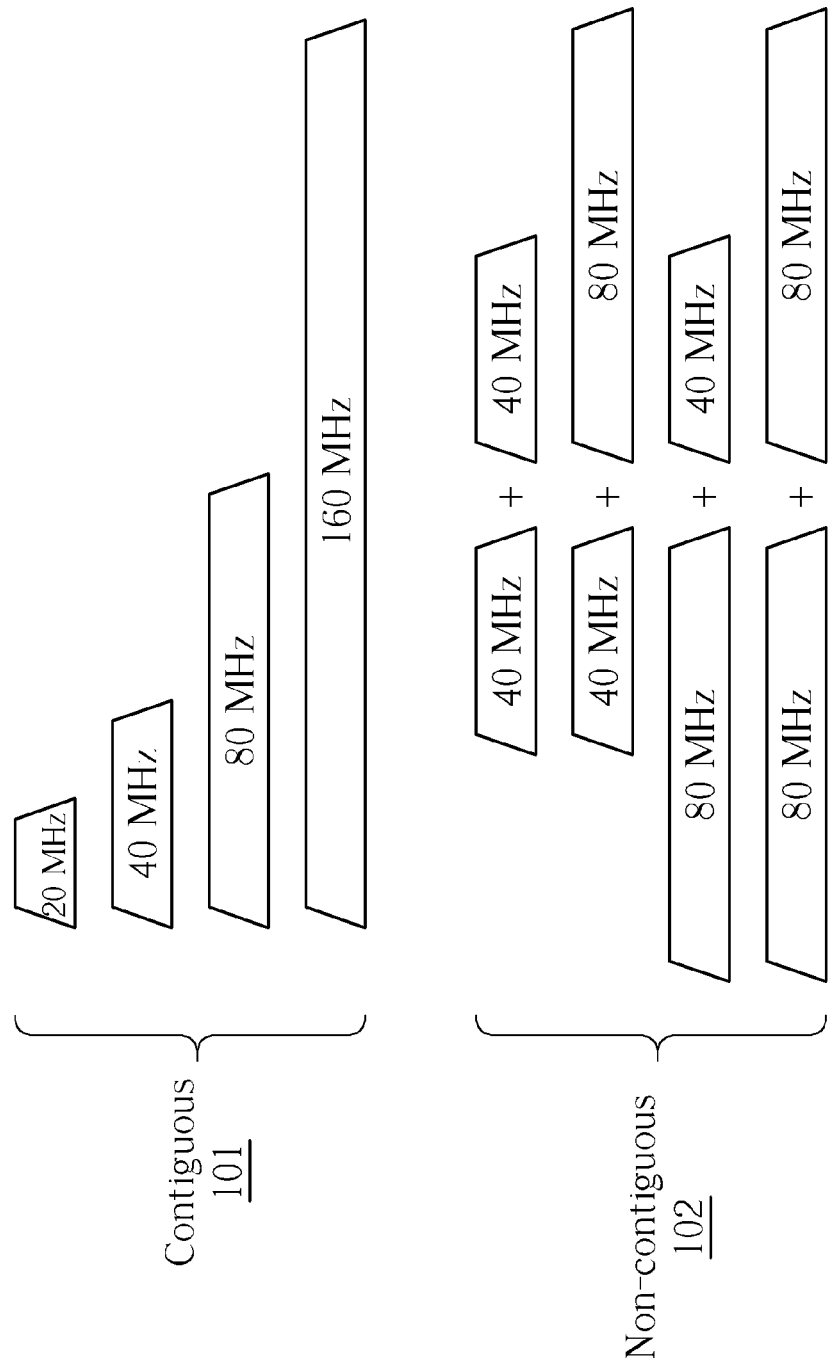
FIG. 1 is a diagram illustrating exemplary continuous spectrums and non-continuous spectrums according to the related art.
Figure 2:
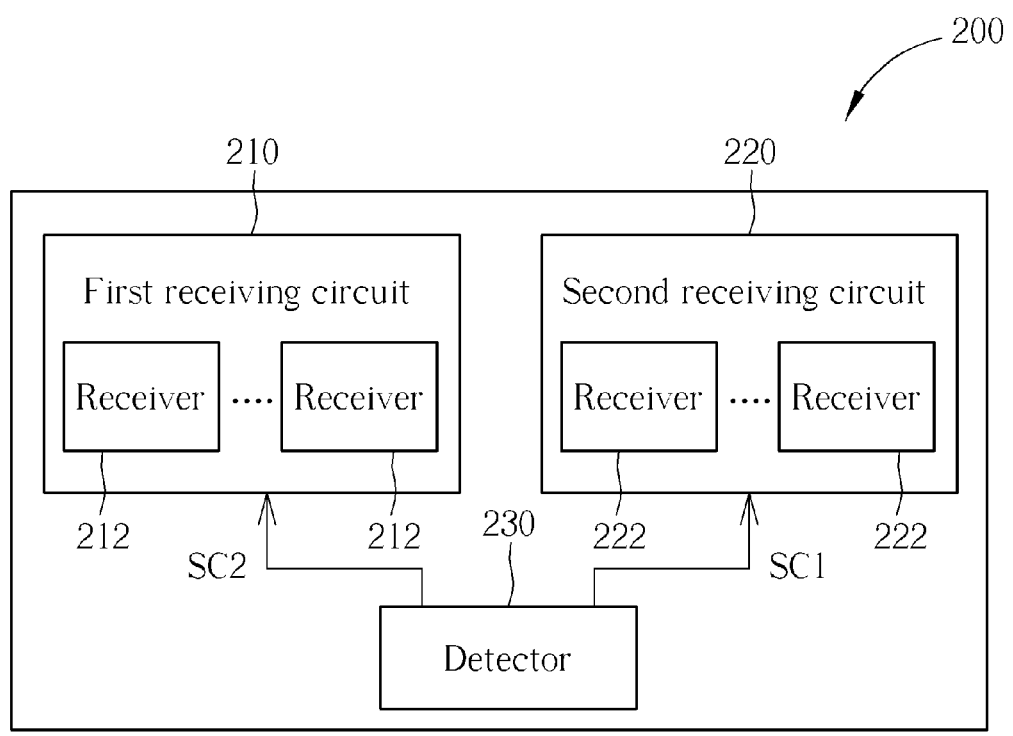
FIG. 2 is a diagram illustrating a wireless device according to an embodiment of the present invention.

FIG. 2 is a diagram illustrating a wireless device 200 according to an embodiment of the present invention. By way of example, but not limitation, the wireless device 200 may be a wireless receiving device for receiving signals, and includes a first receiving circuit 210, a second receiving circuit 220 and a detector 230. Note that, although only the elements related to the present invention are shown in FIG. 2, the present invention is not limited thereto. In practice, the wireless device 200 may include more elements to achieve other functions. The first receiving circuit 210 is arranged to receive signals in a first band, such as the first segment of 80 MHz+80 MHz shown in the last row of the non-continuous spectrum 102 of FIG. 1. The second receiving circuit 220 is arranged to selectively receive signals in the first band or receive signals in a second band according to a first control signal SC1. The second band is different from the first band; more particularly, the operating frequency of the second band is higher than the operating frequency of the first. For example, the second band may be the second segment of 80 MHz+80 MHz. The detector 230 is arranged to detect existence of a transmission signal in the second band to set the first control signal SC1.

When the detector 230 does not detect the existence of the transmission signal in the second band (e.g. the second segment of 80 MHz+80 MHz), the first control signal SC1 set by the detector 230 may control the second receiving circuit 220 to receive signals in the first band (e.g. the first segment of 80 MHz+80 MHz). When there is no signal transmitted over a designated band that needs to be received by the second receiving circuit 220, the second receiving circuit 220 may assist the first receiving circuit 210 to receive signals in the first band rather than entering an idle/sleep mode. This eases the load of the first receiving circuit 210 and raises the overall receiving efficiency of the wireless device 200.

When the detector 230 detects the existence of the signal in the second band, the first control signal C1 set by the detector 230 may control the second receiving circuit 220 to receive the transmission signal in the second band. The second receiving circuit 220 is used to assist the first receiving circuit 210 only when there is no need for receiving signals in the second band. In a case where the second receiving circuit 220 is switched to assist the first receiving circuit 210, the second receiving circuit 220 will go back to receive signals in the second band immediately after the detector 230 detects that a signal is transmitted in the second band. In another case where the second receiving circuit 220 is not switched to assist the first receiving circuit 210, the second receiving circuit 220 continues receiving signals in the second band when the detector 230 keeps detecting that a signal is transmitted in the second band.

The above is merely for illustrative purposes, and not meant to be a limitation to the present invention. The present invention also proposes an alternative design to be applied to some embodiments. When there is no transmission signal detected in the first band, the first receiving circuit 210 may be utilized to assist the second receiving circuit to receive signals in the second band rather than entering an idle/sleep mode. Specifically, the detector 230 may set a second control signal SC2 by detecting the existence of a transmission signal in the first band. The first receiving circuit 210 may further selectively receive signals in the first band or signals in the second band according to the second control signal SC2. In other words, when the detector 230 does not detect the existence of a signal in the first band, the second control signal SC2 set by the detector 230 may control the first receiving circuit 210 to receive signals in the second band; and when the detector 230 detects the existence of the transmission signal in the first band, the second control signal SC2 set by the detector 230 may control the first receiving circuit 210 to receive the transmission signal in the first band.

Since one receiving circuit may assist another (i.e. one of the second reviving circuit 220 and the first receiving circuit may assist the other) when signal reception only needs to be performed in one continuous band, the wireless device 200 may fully use all the receiving circuits, thereby raising the overall receiving efficiency.

Figure 3:
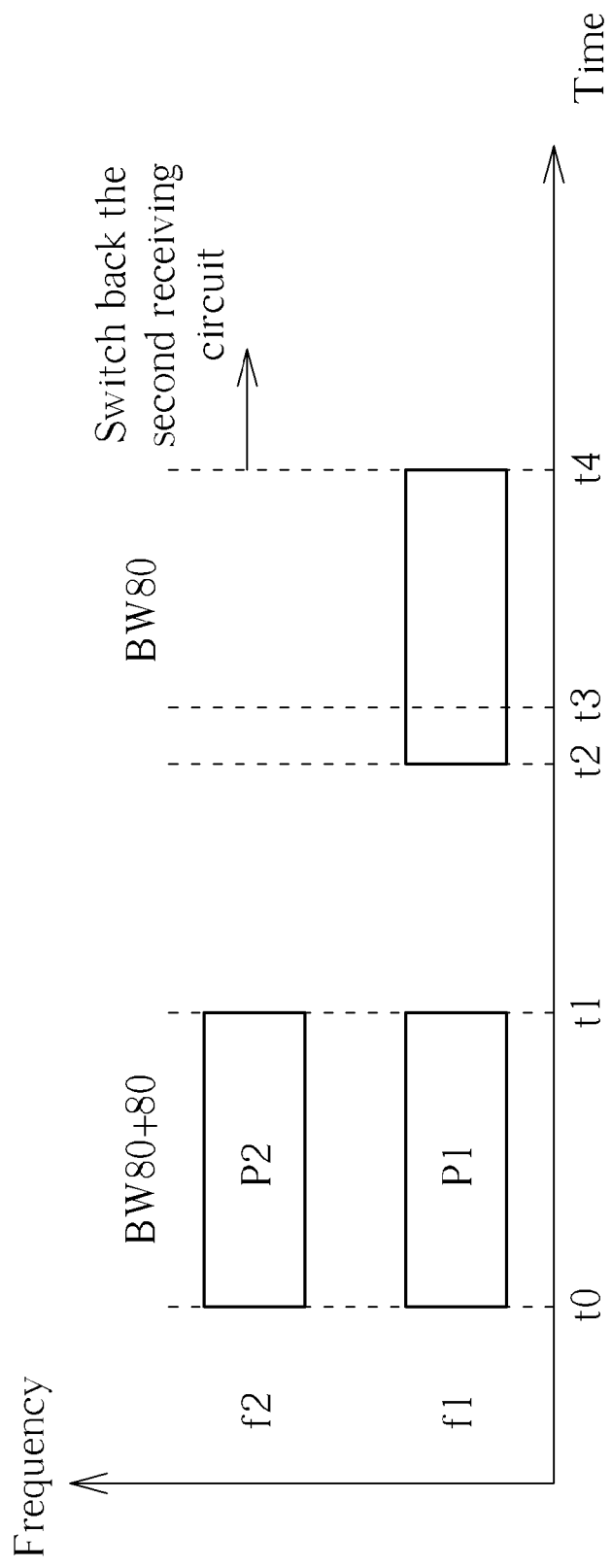
FIG. 3 is a time-frequency diagram illustrating a signal reception scheme of the wireless device according to an embodiment of the present invention.

FIG. 3 is a time-frequency diagram illustrating a signal reception scheme of the wireless device 200 according to an embodiment of the present invention. In this example, FIG. 3 sequentially shows a non-continuous packet reception scenario (denoted as BW80+80) and a continuous packet only reception scenario (denoted as BW80), wherein the horizontal axis represents time, and the vertical axis represents frequency. The detector 230 of the wireless device 200 is used to detect the existence of packets in the bands f1 and f2, wherein the band f2 is higher than the band f1. As shown in FIG. 3, during t0-t1, it is detected that there are packets P1 transmitted in the band f1 and packets P2 transmitted in the band f2. The first control signal SC1 set by the detector 230 controls the second receiving circuit 220 to continue receiving the packets P2 in the band f2. The packets P2 are not transmitted in the band f2 at t2. The detector 230 of the wireless device 200 will detect the existence of the packets P1 only during t2-t3. Because there is no signal which needs to be received in the second band f2, the first control signal SC1 set by the detector 230 will control the second receiving circuit 220 to assist the first receiving circuit 210 to receive the packets P1 in the band f1, thus raising the overall receiving efficiency. After the reception for the packets P1 in the band f1 is completed, the second receiving circuit 220 may be automatically switched back to receive signals in the band f2. The above is for illustrative purposes, and not meant to limit the present invention. The operation shown in FIG. 3 can be modified, such as utilizing the first receiving circuit 210 to assist the second receiving circuit 220. Detailed description for such an alternative design is omitted here for brevity.

The above proposed scheme may be applied to a multiple input multiple output (MIMO) system. The second receiving circuit 220 may include a plurality of receivers 222, each arranged to selectively receive signals in the first band (e.g. the first 80 MHz) or in the second band (e.g. the second 80 MHz) according to the second control signal SC2 set by the detector 230. Due to the fact that a plurality of receivers previously arranged for receiving signals in the first band may be utilized to assist a plurality of receivers arranged for receiving signals in the second band, the receiving efficiency of the wireless device 200 in the MIMO system can be raised.

In addition, as shown in FIG. 2, the first receiving circuit 210 may also include a plurality of receivers 212, each arranged to selectively receive signals in the first band or signal reception in the second band according to the second control signal SC2. In the MIMO system, the receivers 212 of the first receiving circuit 210 may also be utilized to assist the receivers of the second receiving circuit 220 to receive signals in the second band. Moreover, based on the actual design requirements of the MIMO system, the receivers 212, 222 of the first receiving circuit 210 and the second receiving circuit 220 may be arranged to assist each other. Any combination or modification of adaptively utilizing one receiving circuit to receive signals in a different band based on the load of this receiving circuit falls within the claimed scope of the present invention. Although there are a plurality of receivers depicted in the receiving circuits 210 and 220, the present invention is not limited thereto. In practice, each of the receiving circuits 210 and 220 may include only one receiver.

Figure 4:
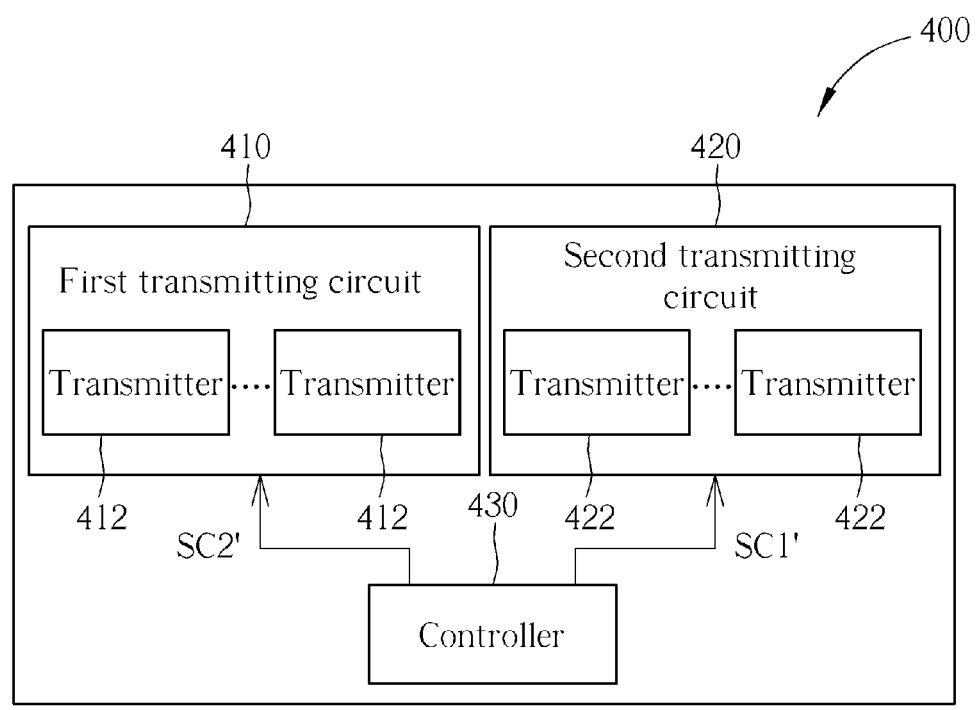
FIG. 4 is a diagram illustrating a wireless device of the according to an embodiment of the present invention.

FIG. 4 is a diagram illustrating a wireless device 400 according to an embodiment of the present invention. The wireless device 400 may be utilized to perform signal transmissions to the wireless device 200. By way of example, but not limitation, the wireless device 400 may include a first transmitting circuit 410, a second transmitting circuit 420 and a controller 430. Note that, although only the elements related to the present invention are shown in FIG. 4, the present invention is not limited thereto. In practice, the wireless device 400 may include more elements to achieve other functions. The first transmitting circuit 410 is arranged to perform at least signal transmission in a first band (e.g. the aforementioned first band f1). The second transmitting circuit 420 is arranged to selectively perform signal transmission in the first band or perform signal transmission in a second band (e.g. the aforementioned second band f2) according to a first control signal SC1', wherein the second band is different from the first band, and the first band and the second band may be non-continuous bands.

The controller 430 is arranged to set the first control signal SC1' according to a transmission mode. For example, when the transmission mode does not use the second band, the first control signal SC1' set by the controller 430 controls the second transmitting circuit 420 to perform signal transmission in the first band; and when the transmission mode uses the second band, the first control signal SC1' set by the controller 430 controls the second transmitting circuit 420 to perform signal transmission in the second band.

Figure 5:
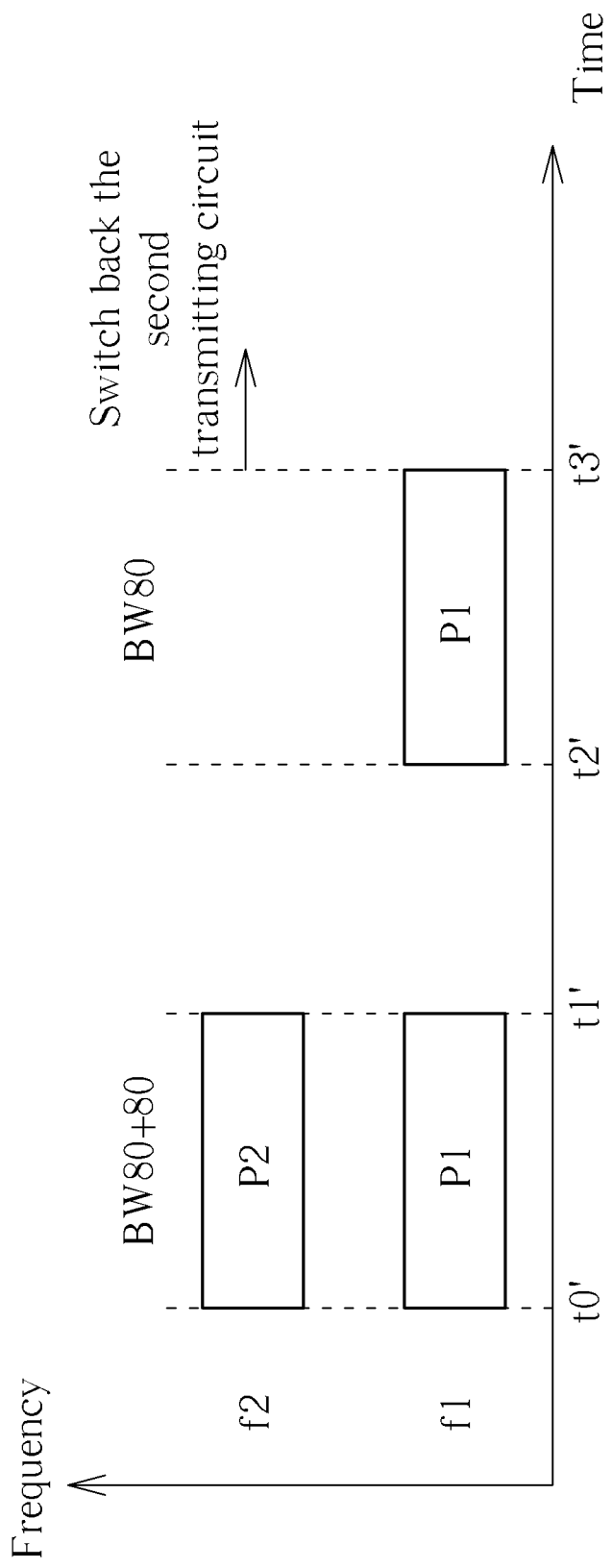
FIG. 5 is a time-frequency diagram illustrating a signal transmission scheme of the wireless device according to an embodiment of the present invention.

For better understanding, refer to FIG. 5, which is a time-frequency diagram illustrating a signal transmission scheme of the wireless device 400 according to an embodiment of the present invention. In this example, FIG. 5 sequentially shows a non-continuous packet transmission scenario (denoted as BW80+80) and one continuous packet only transmission scenario (denoted as BW80). As shown in FIG. 5, during t0'-t1', the wireless device 400 may transmit packets P1 in the band f1 and transmit packets P2 in the band f2, wherein the band f2 is higher than the band f1. Next, during t2'-t3', the wireless device 400 only transmits the packets P1 in the band f1. As there is no signal transmitted in the second band f2 during t2'-t3', the first control signal SC1' will control the second transmitting circuit 420 to assist the first transmitting circuit 410 to transmit the packets P1 in the band f1, thus raising the overall transmitting efficiency. After the transmission for the packets P1 in the band f1 is completed, the second transmitting circuit 420 may be automatically switched back to perform transmission in the band f2.

The first transmitting circuit 410 may be arranged to selectively perform signal transmission in the first band f1 or signal transmission in the second band f2 according to a second control signal SC2', wherein the controller 430 is further arranged to set the second control signal SC2' according to another transmission mode. For example, when there is a need to transmit signals in the first band f1, the second control signal SC2' set by the controller 430 may control the first transmitting circuit 410 to perform signal transmission in the first band f1; and when the first transmitting circuit 410 does not perform signal transmission in the first band f1, the second control signal SC2' set by the controller 430 may control the first transmitting circuit 410 to perform signal transmission in the second band f2. That is, besides utilizing the second transmitting circuit 420 to assist the first transmitting circuit 410, the first transmitting circuit 410 can also be utilized to assist the second transmitting circuit 420.

The above proposed signal transmission scheme may be applied to a multiple input multiple output (MIMO) system. For example, the second transmitting circuit 420 may include a plurality of transmitters 422, each arranged to selectively perform signal transmission in the first band (e.g. the first 80 MHz of the last row shown in FIG. 1) or perform signal transmission in the second band (e.g. the second 80 MHz of the last row shown in FIG. 1) according to the first control signal SC1' set by the controller 430. As a plurality of transmitters previously arranged for performing signal transmission in the first band may be utilized to assist a plurality of transmitters arranged for performing signal transmission in the second band, the transmitting efficiency of the wireless device 400 can be raised. The first transmitting circuit 410 may also include a plurality of transmitters 412, each arranged to selectively perform signal transmission in the first band or perform signal transmission in the second band according to the second control signal. In the MIMO system, the transmitters 412 of the first transmitting circuit 410 may also be utilized to assist the transmitters of the second transmitting circuit 420 to perform signal transmission in the second band.

Based on the actual design requirements of the MIMO system, the transmitters 412, 422 of the first transmitting circuit 410 and the second transmitting circuit 420 may be arranged to assist each other. Any combination or modification of adaptively utilizing one transmitting circuit to perform signal transmission in a different band based on the load of this transmitting circuit falls within the claimed scope of the present invention. Although there are a plurality of transmitters depicted in the transmitting circuits 410 and 420, the present invention is not limited thereto. In practice, each of the transmitting circuits 410 and 420 may include only one transmitter.

In addition to the methods and devices mentioned above, the present invention also provides a method for a wireless device. The wireless device receives a wireless signal in the first band with a first receiving circuit. If the wireless device finds that the wireless signal is in the first band only, the wireless device switches a second receiving circuit from receiving a second band to the first band. When the wireless signal ends, the wireless device switches the second receiving circuit back to receive the second band. According to an embodiment of the present invention, the first band is different from the second band. Since one skilled in the art may realize the theory of this method by referring to above embodiments, the detailed implementations are omitted here for brevity.

To summarize, the embodiments/modifications of the present invention are capable of optimizing the usage of a wireless device (e.g. the wireless device 200 shown in FIG. 2) and/or the usage of a wireless device (e.g. the wireless device 400 shown in FIG. 4), thus improving the operating efficiency of the wireless device and the wireless device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless device, comprising:
 a first receiving circuit, arranged to receive signals in a first band; and
 a second receiving circuit, arranged to selectively receive signals in the first band or in a second band according to a first control signal, wherein the second band is different from the first band; and
 a detector, arranged to set the first control signal according to an existence of a transmission signal in the second band;
 wherein when the detector does not detect the existence of the transmission signal in the second band, the first control signal set by the detector controls the second receiving circuit to receive signals in the first band while the first receiving circuit remains signal reception in the first band; when the detector detects the existence of the transmission signal in the second band, the first control signal set by the detector controls the second receiving circuit to receive the transmission signal in the second band while the first receiving circuit remains signal reception in the first band; and the first receiving circuit and the second receiving circuit receive signals simultaneously.

2. The wireless device of claim 1, wherein the second receiving circuit comprises a plurality of receivers, each arranged to selectively receive signals in the first band or signal reception in the second band according to the first control signal.

3. The wireless device of claim 1, wherein the first receiving circuit is further arranged to selectively receive signals in the first band or signal reception in the second band according to a second control signal; and the detector is further arranged to detect existence of a transmission signal in the first band to set the second control signal.

4. The wireless device of claim 3, wherein when the detector does not detect the existence of the transmission signal in the first band, the second control signal set by the detector controls the first receiving circuit to receive signals in the second band.

5. The wireless device of claim 3, wherein when the detector detects the existence of the transmission signal in the first band, the second control signal set by the detector controls the first receiving circuit to receive the transmission signal in the first band.

6. The wireless device of claim 3, wherein the second receiving circuit comprises a plurality of receivers, each arranged to selectively receive signals in the first band or signal reception in the second band according to the first control signal.

7. The wireless device of claim 3, wherein the first receiving circuit comprises a plurality of receivers, each arranged to selectively receive signals in the first band or signal reception in the second band according to the second control signal.

8. The wireless device of claim 1, wherein the first band and the second band are non-continuous bands.

9. A method, comprising,
receiving a wireless signal in the first band with a first receiving circuit;
switching a second receiving circuit from receiving a second band to the first band if the wireless signal is in the first band only; and
switching the second receiving circuit to receive the second band when the wireless signal ends;
wherein the first band is different from the second band; when an existence of the transmission signal in the second band is not detected, controlling the second receiving circuit to receive signals in the first band while the first receiving circuit remains signal reception in the first band; when the existence of the transmission signal in the second band is detected, the first control signal set by the detector controls the second receiving circuit to receive the transmission signal in the second band while the first receiving circuit remains signal reception in the first band; and the first receiving circuit and the second receiving circuit receive signals simultaneously.

* * * * *